(12) United States Patent
Rogers et al.

(10) Patent No.: US 6,201,547 B1
(45) Date of Patent: Mar. 13, 2001

(54) METHOD AND APPARATUS FOR SEQUENCING TEXTURE UPDATES IN A VIDEO GRAPHICS SYSTEM

(75) Inventors: Philip J. Rogers, Pepperell; Xiaoqing Wu, Dracut, both of MA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/166,346

(22) Filed: Oct. 5, 1998

(51) Int. Cl.⁷ ................................................. G06T 15/00
(52) U.S. Cl. ........................ 345/430; 345/508; 345/507
(58) Field of Search .................................. 345/430, 429, 345/501–525

(56) References Cited

U.S. PATENT DOCUMENTS

| | | | |
|---|---|---|---|
| 5,422,997 | * 6/1995 | Nagashima | 395/166 |
| 5,696,892 | * 12/1997 | Redmann et al. | 395/125 |
| 5,831,640 | * 11/1998 | Wang et al. | 345/521 |
| 5,844,576 | * 12/1998 | Wilde et al. | 345/525 |
| 5,877,771 | * 3/1999 | Drebin et al. | 345/430 |
| 6,037,948 | * 3/2000 | Liepa | 345/430 |

* cited by examiner

*Primary Examiner*—Matthew Luu
*Assistant Examiner*—Daniel Chung
(74) *Attorney, Agent, or Firm*—Markison & Reckamp, P.C.

(57) ABSTRACT

A method and apparatus for sequencing texture updates in a video graphics system is accomplished by storing a first portion of graphics data in a first position of a bus master buffer, where the first portion of the graphics data utilizes a texture. An indication of a texture update is then received, where the texture update, when performed, modifies the texture to produce an updated texture that is used by subsequent graphics data. The updated texture is stored in a second position of the bus master buffer. A second portion of the graphics data, which utilizes the updated texture, is then stored in a third position of the bus master buffer. The data in the bus master buffer is then accessed through a direct memory access transfer initiated by the graphics processor in the system. The bus master buffer data is accessed in a sequential manner, which ensures that the texture update does not occur until after the graphics data utilizing the original texture has been drawn.

16 Claims, 4 Drawing Sheets

METHOD AND APPARATUS FOR SEQUENCING TEXTURE UPDATES IN A VIDEO GRAPHICS SYSTEM

FIELD OF THE INVENTION

The invention relates generally to video graphics processing and more particularly to a method and apparatus for sequencing texture updates in a video graphics system.

BACKGROUND OF THE INVENTION

Computers are used in many applications. As computing systems continue to evolve, the graphical display requirements of the systems become more demanding. This is especially true in applications where detailed graphical displays must be updated quickly. One example of such an application is a computer game where movement and modification of background images may place great demands on the processing power of the computing system.

In order to display some screen images, detailed textures are stored in memory. These textures are then molded and adapted to overlay or map to structures for display. An example is a brick pattern that would be mapped onto a wall structure, where if the wall is extending into the distance, the texture will be mapped in such a way to show perspective.

In video graphics systems, draw commands are interspersed with changes in textures. In other words, a number of draw commands may be executed that use a first texture, and then a new texture may be loaded for a second set of draw commands. In order to avoid corrupting these drawing operations, the processor may be forced to wait for some of these commands to be executed by a graphics processor that is part of the system. When the processor is forced to wait for the graphics processor to complete a drawing command or texture load, the efficiency of the system is compromised. Delays experienced by the processor translate into overall slowdowns in the execution of the program.

Consequently, a need exists for a system that allows the processor to transfer drawing commands and texture changes to the graphics processor in a faster, more efficient manner.

DETAILED DESCRIPTION OF A PREFERRED EMBODIMENT OF THE INVENTION

Generally, the present invention provides method and apparatus for sequencing texture updates in a video graphics system. This is accomplished by storing a first portion of graphics data in a first position of a bus master buffer, where the first portion of the graphics data utilizes a texture. An indication of a texture update is then received, where the texture update will modify the texture to produce an updated texture that will be used by subsequent graphics data. The updated texture is stored in a second position of the bus master buffer. A second portion of the graphics data, which utilizes the updated texture, is then stored in a third position of the bus master buffer. The data in the bus master buffer is then accessed through a direct memory access transfer initiated by the graphics processor in the system. The data is accessed in a sequential manner, which ensures that the texture update does not occur until after the graphics data utilizing the original texture has been drawn. By creating a bus master buffer which stores textures as well as the graphics data which utilize the textures, the processor can store a number of sequential drawing commands in the bus master buffer and then perform other tasks. This offloading of the processor in the system improves the overall speed of the video graphics system by avoiding the wait states that are typically encountered by processors in prior art systems.

Figure 1:
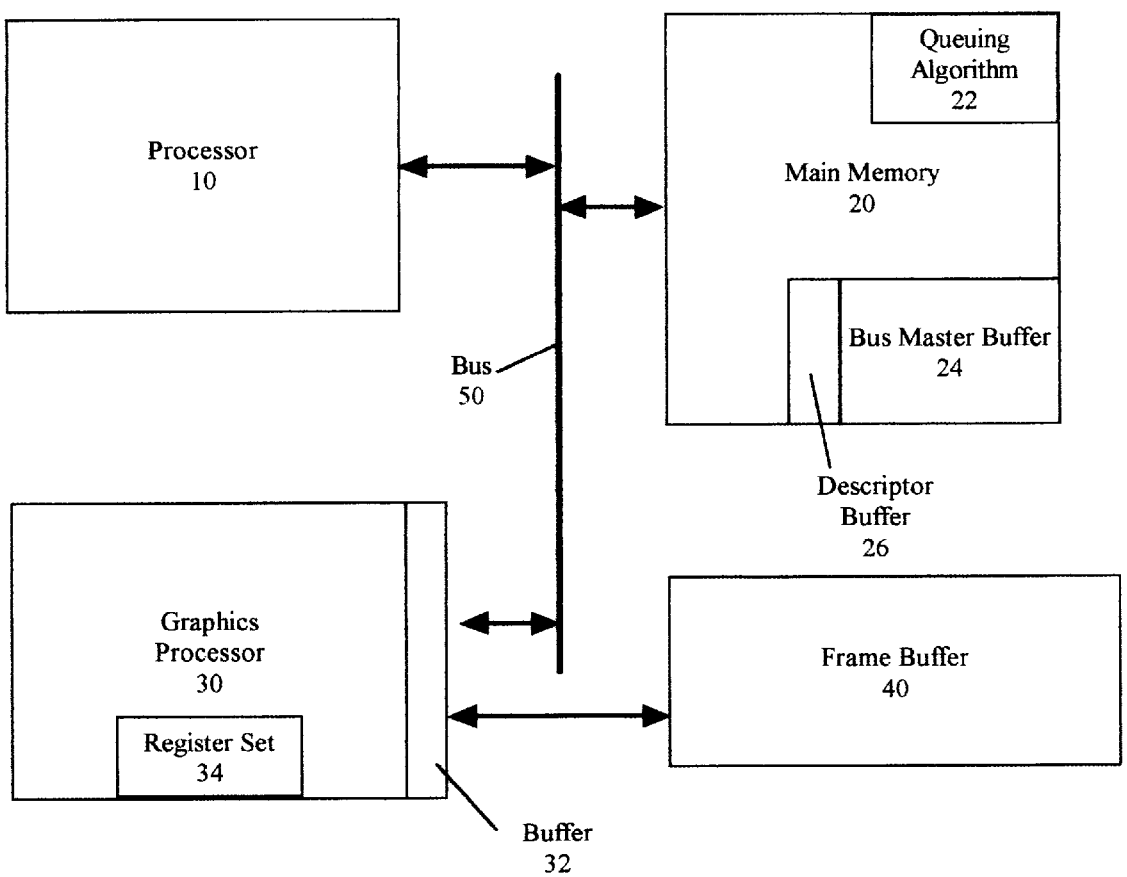
FIG. 1 illustrates a block diagram of a video graphics system in accordance with the present invention.

The present invention can be better understood with reference to FIGS. 1–4. FIG. 1 illustrates a video graphics system that includes a processor 10, a main memory 20, a graphics processor 30, and a frame buffer 40. Preferably, the graphics processor 30 and frame buffer 40 are dedicated to video graphics processing aspects of the system. It is also preferable that the graphics processor 30 is coupled to the processor 10 and main memory 20 via a bus 50. The processor 10 may have additional connections to the main memory 20.

The main memory 20 may include a number of memory blocks of the overall computer system including, but not limited to, random access memory (RAM), read only memory (ROM), and hard drive storage. The main memory 20 includes a bus master buffer 24 that facilitates direct memory access (DMA) transfers between the main memory 20 and the graphics processor 30. DMA transfers allow the graphics processor 30 to become the controller of the bus 50, or "bus master". When the graphics processor 30 is the bus master, it is able to perform direct memory transfers with the main memory 20. These DMA transfers are more efficient than requesting the processor 10 to perform the transfers.

Preferably, the bus master buffer 24 is made up of a number of pages, where each page includes a set of physical addresses in the main memory 20. The structure of the bus master buffer 24 can be better understood with reference to FIG. 2, which illustrates a bus master buffer 24 having N pages, where N is a number. The number of pages, N, in a particular system is based on the preferred size of the pages and the amount of memory the system allocates to the bus master buffer 24. Preferably, the bus master buffer 24 is implemented as a circular buffer such that after the Nth page 70 of the buffer 24 is accessed, the next page that is accessed will be the first page 62.

The bus master buffer 24 provides a set of pages in which data to be transferred via DMA can be stored prior to transfer. In some embodiments, DMA transfers can be initiated by the graphics processor 30 based only on physical addresses within the main memory 20. This is because virtual memory address translation is not available in DMA transfers in some embodiments. For this reason, the bus master buffer 24 is initially set up by requesting the desired amount of physical memory space from the processor 10. If the processor 10 denies the original memory request, smaller blocks of memory may be requested, thus reducing the number of pages in the bus master buffer 24. Preferably, the pages in the bus master buffer 24 are 4K bytes in size, and the number of pages (N) in the bus master buffer 24 is 1024. Typically the number of pages will be based on a power of two which facilitates implementation in most computer systems. It should be apparent to one skilled in the art that the page size and number of pages may be selected based on the needs of different systems.

Returning to FIG. 1, the processor 10 produces draw commands used by the graphics processor 30. The draw commands may utilize a texture that has already been stored in the frame buffer 40. If there are many draw commands for a particular texture, the processor 10 may buffer, or queue, the commands in the bus master buffer 24. This allows the processor 10 to perform other tasks while it waits for the draw commands to be acted upon by the graphics processor 30. Preferably, draw commands are accomplished by storing a set of command data in a register set 34 of the graphics processor 30. In order to simplify the transfer of data to the register set 34, the data for the register set 34 may be stored sequentially in the bus master buffer 24 such that it can be transferred in a single-block DMA transfer.

In order to facilitate such register set transfers, the data to be transferred to the register set 34 may be described with a starting point, a corresponding number of registers that will be filled, and the values for the registers. This can be done using a descriptor, which is discussed below. The descriptor structure in memory stores the source and destination addresses for each page in the bus master buffer and the number of valid bytes in each page. Descriptors point to the physical page in memory and allow the DMA transfer, which in some systems requires such physical addresses, to proceed.

Thus, the processor 10 stores command data in the bus master buffer 24 that results in the draw commands being executed. Problems in such a system can arise when the texture that is being used for the draw commands is modified for subsequent draw commands. In prior art systems, texture modifications are normally made directly to the frame buffer 40, which is where textures are stored for use. Queuing drawing operations can cause this direct modification of textures to corrupt the graphical display.

To illustrate, assume that the processor 10 queues a first set of draw commands in the bus master buffer 24, where the first set of draw commands utilize a texture that is stored in the frame buffer 40. If the subsequent or second set of draw commands utilize a second texture that modifies the first texture, the processor 10 has to wait for the first set of draw commands to complete before it can modify the texture. If the modification to the first texture is performed prior to the completion of the first set of draw commands, those draw commands that have not yet been completed will use the texture in various stages of modification, and this provides corrupted results.

If the processor 10 is forced to wait for the first set of draw commands to be completed, the benefits of the bus master buffer 24 may be severely diminished. The present invention provides a method for ensuring that the texture modifications of the video graphics system occur in the proper sequence with respect to the draw commands that are being executed. This is accomplished by storing new textures in the bus master buffer 24 along with the draw commands. The texture changes are stored in the bus master buffer 24 such that they are fetched by the graphics processor 30 after the draw commands using previous textures have completed.

The main memory 20 stores a queuing algorithm 22 which, when executed by the processor 10, causes the processor 10 to act in a predetermined manner such that it performs a specific set of functions. First, the processor 10 stores a first texture in the bus master buffer 24. The processor 10 then stores the first set of command data which causes a first set of elements to be drawn. The first set of elements may utilize the first texture. Once the draw commands using the first texture are stored, a second texture is stored in the bus master buffer 24 in a location subsequent to the first set of command data. Because the second texture is stored subsequent to the first set of command data, when the graphics processor 30 performs a DMA transfer and fetches the data from the bus master buffer 24, the draw commands associated with the first set of command data will be fetched and utilized prior to the fetching of the second texture.

Finally, the processor 10 stores a second set of command data in the bus master buffer, where the second set of command data cause a second set of elements to be drawn. Because the second texture precedes the second set of command data in the bus master buffer 24, the second texture will be in place in the frame buffer 40 for use in drawing the second set of elements. Configuring the bus master buffer 24 in such a way that subsequent textures can be included in the stream of data fetched by the graphics processor 30 allows the ordering of the operations performed by the graphics processor 30 to be controlled. This ensures that texture modifications and drawing commands do not occur out of order, which can result in image corruption and errors.

In order to better utilize the bus master buffer 24, a descriptor buffer 26 can be included in the system. The descriptor buffer 26 includes a plurality of descriptors, and each descriptor corresponds to a page in the bus master buffer 24. Because the bus master buffer 24 many require physical addresses in the main memory 20, and a sequential block of memory large enough to accommodate the entire bus master buffer 24 may not be available, the pages of the bus master buffer 24 may be scattered about the main memory 20. The descriptor buffer 26 stores the location of each of the pages of the bus master buffer 24.

Figure 2:
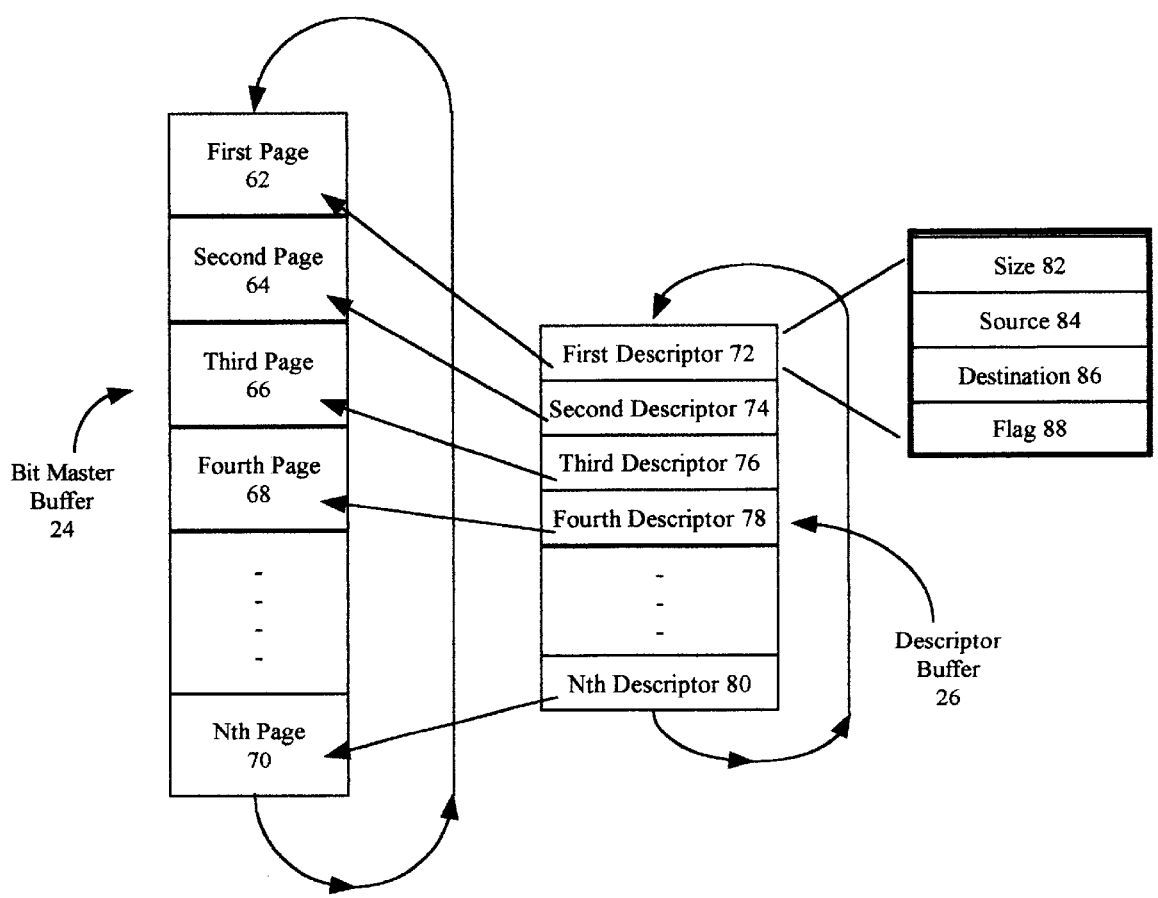
FIG. 2 illustrates a block diagram that illustrates memory structures utilized in a video graphics system in accordance with the present invention.

FIG. 2 illustrates the relationship between the descriptor buffer 26 and the bus master buffer 24. The descriptor buffer 26 is a circular buffer such that after the Nth descriptor 80 is accessed, the next descriptor to be accessed is the first descriptor 72. The first descriptor 72 corresponds to the first page 62 of the bus master buffer 24. Similarly, each other descriptor 74–80 of the descriptor buffer 26 corresponds to one of the pages 64–70 of the bus master buffer 24.

The preferred structure of a descriptor is illustrated with respect to the first descriptor 72. Preferably, a descriptor includes a size 82, a source address 84, a destination address 86, and a flag 88. The source address 84 describes the location of the corresponding bus master buffer page in memory. The destination address 86 describes the location to which the data in the corresponding page is to be transferred. The size indicates the number of bytes of data that is to be transferred. For a command data set, the size would be based on the number of registers to be filled. For a texture, the size of a single page may not be adequate to store the entire texture. The flag 88 is included to indicate that there is overflow to the next page of the bus master buffer 24. If the flag 88 is set, the data block to be transferred is continued in the next page of the bus master buffer 24, which is described by the subsequent descriptor.

For example, if the first page 62 stores a set of command data which draws an element, the descriptor 72 will contain a size 82 corresponding to the size of the register set 34, the source 84 will point to the first page 62 in main memory 20, and the destination 86 will point to the register set 34. In one embodiment, the flag 88, which may be a single bit, will not be set as the command set fits within the first page 62. If the next entity stored in the bus master buffer 24 is a new texture that is so large that it requires three pages of memory, it will be stored in the second page 64, the third page 66, and the fourth page 68. The second and third descriptors 74 and 76 will have their respective flag bits set, indicating in each case that the next descriptor contains a continuation of the texture. The fourth descriptor 78, however, will not have the flag bit set, as it points to the final page that stores a portion of the texture.

In another embodiment, the flag 88 is used to indicate that when the DMA transfer of the current page is completed, the transfer should continue and transfer the page pointed to by the following descriptor. For example, if the processor 10 stores a first set of drawing commands followed by a new texture and another set of drawing commands, all of this data may be fetched during the next DMA transfer initiated by the graphics processor 30. By fetching the data in large blocks, the graphics processor 30 does not have to repetitively perform the functions required to become the bus master, which it may have to do if it only transfers a single set of drawing commands or a single texture each time it is the bus master. The processor 10 can thus partition the DMA transfer data by not setting the flag 88 at the partition points.

The graphics processor 30 may also include a buffer 32 that allows portions of the data fetched from the bus master buffer 24 to be stored until the graphics processor 30 is ready to process the data. The buffer 32 allows large blocks of data to be transferred in a single instance of bus mastering. The data is then stored in the buffer 32 where it is used by the graphics processor 30 when convenient. This can be advantageous if it is difficult to gain bus master access to the bus 50, as a single DMA operation could transfer larger portions of data from the bus master buffer 24.

Figure 3:
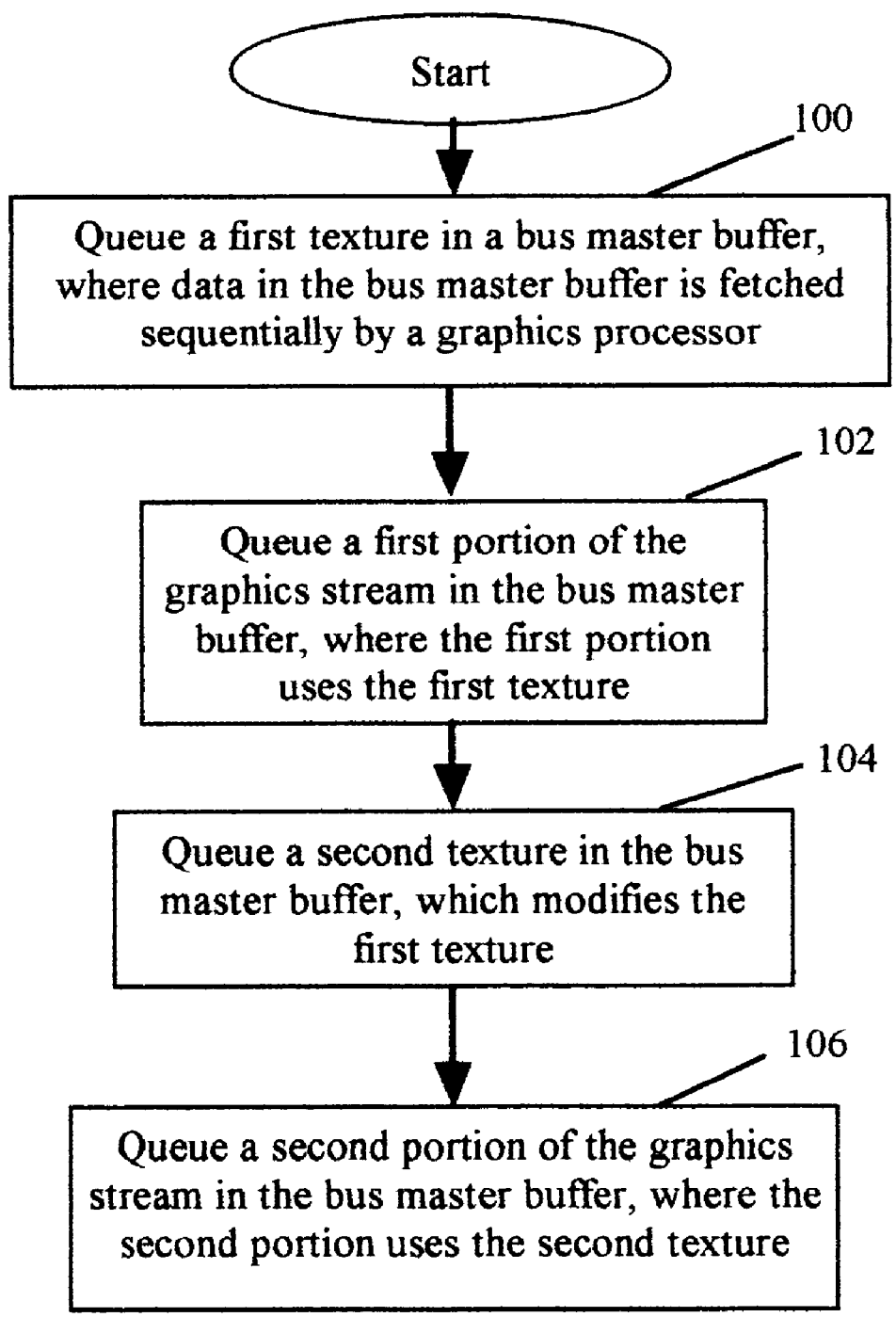
FIG. 3 illustrates a flow chart of a method for queuing a texture update in relation to a graphics stream in accordance with the present invention.

FIG. 3 illustrates a method for queuing a texture update in relation to a graphics stream that allows a processor to avoid waiting for previous operations to complete before submitting subsequent operations. At step 100, a first texture is queued in a bus master buffer. Preferably, the bus master buffer is similar to that described above in that it includes a number of pages and is arranged as a circular buffer. Data in the bus master buffer is fetched sequentially by a graphics processor for use in drawing the graphics stream. A set of descriptors as described with respect to FIGS. 1 and 2 may be included in the system to effectuate the fetching of the bus master buffer pages.

At step 102, a first portion of the graphics stream is queued in the bus master buffer. The first portion of the graphics stream utilizes the first texture in drawing the primitives or shapes within that portion of the graphics stream. Note that additional portions of the graphics stream that do not utilize a stored texture or that utilize a texture that is not altered can be interspersed at various points in the bus master buffer.

At step 104, a second texture is queued in the bus master buffer. The second texture modifies the first texture. Therefore, if the second texture were stored directly into the frame buffer of the system, it would corrupt the first texture. If the first texture is corrupted before the first portion of the graphics stream is drawn, errors in the drawing will result.

At step 106, a second portion of the graphics stream is queued in the bus master buffer, where the second portion of the graphics stream uses the second texture in drawing its respective primitive or primitives. A portion of the graphics stream may include a single primitive, or triangle, or may include a plurality of primitives that make up a more complex shape. At any point after the first texture has been stored, the graphics processor may begin fetching data from the bus master buffer. The data is fetched and acted upon sequentially, assuring that the order of the operations is maintained. Preferably, the fetching is accomplished through DMA operations initiated by the graphics processor.

The method of FIG. 3 provides a queuing technique that can be used to ensure that textures are not changed, or corrupted, before their use is completed. By queuing the operations using the textures in the same queue as the textures themselves, problems with ordering of the operations with respect to texture changes are avoided. The queuing, or buffering, allows the processor in the system to store a number of video graphics operations or commands in the bus master buffer and then perform other tasks without having to wait or monitor the progress of the graphics processor.

Figure 4:
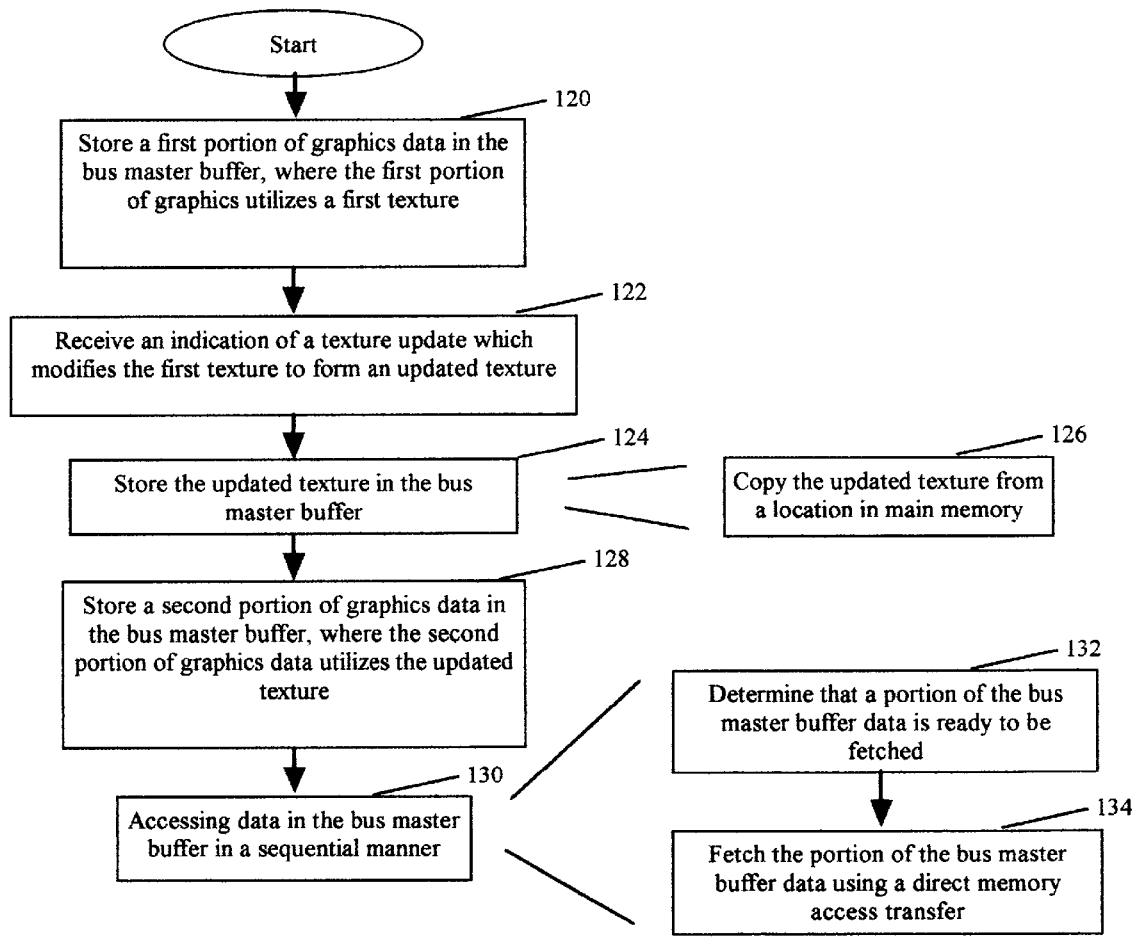
FIG. 4 illustrates a flow chart of a method for sequencing a texture update in accordance with the present invention.

FIG. 4 illustrates a method for sequencing a texture update in a video graphics system. At step 120, a first portion of graphics data is stored in a bus master buffer, where the first portion of graphics data utilizes a texture. Preferably, the texture is stored in the frame buffer of the system. When the graphics processor receives the first portion of the graphics data, it can process the data along with the texture stored in the frame buffer to produce the graphical images the command data describes.

At step 122, an indication of a texture update is received. The texture update, when executed, will modify the texture currently present. As before, if the texture update occurs before the first portion of graphics data has been fully processed, the results will be erroneous and undesirable. Therefore, the texture update must be delayed in order to ensure that this does not occur.

The optimal solution is to delay the texture update just until the graphics processor has processed the first portion of graphics data. The first portion of graphics data is stored in the bus master buffer and will not be processed until after it has been fetched. Based on this, a near optimal solution is achieved at step 124 when the updated texture is stored in the portion of the bus master buffer that will be fetched after the portion containing the first portion of graphics data.

Preferably, at step 126, the updated texture is stored in the bus master buffer by copying the texture from a location in the memory of the system to the bus master buffer. When the data has been copied, the processor can be notified that the texture modification has taken place. This allows the processor to reuse the portion of memory from which the updated texture was copied.

As described above, the bus master buffer may be constructed of a plurality of pages, and if a texture requires a number of pages, a flag can be set in all but the last page to indicate that the texture is continued on the immediately following page. The flag corresponding to each page can also be used to partition data in the bus master buffer for DMA transfers, as was also described above. Additionally, in order to optimize the usage of a cache memory that may be present in the graphics processor, the updated texture may be copied into the bus master buffer such that the resulting texture is in a tiled format. As is well known in the art, a tiled texture is more likely to produce hits in the cache of the graphics processor and can increase speed in a system utilizing textures.

At step 128, a second portion of graphics data is stored in the bus master buffer, where the second portion of graphics data utilizes the updated texture. After the graphics processor fetches the second portion of graphics data, in order to properly process the data, the graphics processor will require that the updated texture be present in the frame buffer. Because the updated texture precedes the second portion of graphics data in the bus master buffer, the updated texture will be fetched and stored before the second portion of graphics data is processed.

At step 130, data in the bus master buffer is accessed in a sequential manner such that the texture update is performed subsequent to the drawing of the first portion of graphics data. Note that the first portion of graphics data can be fetched before the updated texture is stored in the bus master buffer, and the only requirement is that the data in the bus master buffer is accessed or fetched sequentially. This ensures that the texture updates occur in the proper timeframe with respect to the processing of the graphics data that makes use of the textures.

Accessing the data may be accomplished as illustrated in steps 132 and 134. At step 132, it is determined that a portion of the bus master buffer data is ready to be fetched. This determination may be based on a signal to the graphics processor from the bus master buffer or based on polling a flag in the bus master buffer or accompanying descriptors. Preferably, the processor of the system sends a signal to the graphics processor indicating that the graphics processor should begin fetching data from the bus master buffer and providing the graphics processor with the address of the first descriptor corresponding to the data to be fetched. At step 134, a portion of the bus master buffer data is fetched using a direct memory access transfer that is preferably initiated by the graphics processor. If the flag bit corresponding to the first portion of data is set, the graphics processor will continue fetching data until it reaches a flag which is not set.

The present invention provides a method and apparatus for sequencing texture updates in a video graphics system. By intermingling the texture updates with the data that utilizes the textures in a buffered system, the ordering of operations is not altered while still allowing the system processor to be offloaded. The buffering allows for data to be transferred to a graphics processor via a DMA transfer, which allows registers and textures to be updated and stored more rapidly than through conventional read/write transfers of data. By using the method and apparatus herein, the speed of systems using graphical processors for graphical displays can be increased without inducing errors or aberrations.

Software algorithms that cause a processor or controller to perform the functions of the methods illustrated herein may be stored in any manner of computer readable medium including, but not limited to, a diskette, magnetic tape, ROM, RAM, a hard disk, or a CD-ROM. Execution of the software by a processor will cause the processor to operate in a specific and predetermined manner such that it performs the steps or functions required by the methods described above. In some embodiments, circuitry or hardware may perform some or all of the steps or functions, whereas other steps or functions are performed in software.

It should be understood that the implementation of other variations and modifications of the invention in its various aspects will be apparent to those of ordinary skill in the art, and that the invention is not limited by the specific embodiments described. For example, the bus master buffer may be implemented in a separate distinct memory apart from the main memory of the system such that the descriptors can be incorporated into the sequential pages of the bus master buffer. It is therefore contemplated to cover by the present invention, any and all modifications, variations, or equivalents that fall within the spirit and scope of the basic underlying principles disclosed and claimed herein.

What is claimed is:

1. A method for sequencing a texture update in a video graphics system that includes a first processor, a second processor, and a memory, the method comprising the steps of:

storing, by the first processor, first graphics data in a first position of the memory, wherein the first graphics data utilizes first texture data;

storing, by the first processor, second texture data in a second position of the memory, the second position being a position from which data is accessed subsequent to accessing data from the first position;

storing, by the first processor, second graphics data in a third position of the memory, wherein the second graphics data utilizes the second texture data and the third position is a position from which data is accessed subsequent to accessing data from the second position; and accessing, by the seconds processor, the first graphics data, the second texture data and the second graphics data from the memory in a sequential manner such that the texture update is performed following processing of the first graphics data.

2. The method of claim 1, wherein the step of accessing further comprises the steps of:

determining, by the second processor, when at least one of the first graphics data, the second texture data and the second graphics data is ready to be fetched; and fetching, by the second processor, the at least one of the first graphics data, the second texture data and the second graphics data from the memory using a direct memory access transfer.

3. The method of claim 2, further comprising the step of storing, by the first processor, additional texture data and additional graphics data in the memory while the second processor utilizes the first graphics data and the first texture data.

4. The method of claim 3, wherein the step of storing the second texture data in the memory further comprises the step of copying the second texture data into the second position from another location of the memory.

5. The method of claim 4, wherein the memory includes a bus master buffer and wherein the step of storing the second texture data in the memory further comprises the step of storing the second texture data in a plurality of bus master buffer pages, wherein when the second texture data is continued on a subsequent bus master buffer page a flag is set in the preceding page.

6. The method of claim 1, wherein the step of storing the second texture data in the memory further comprises the step of tiling the second texture data.

7. A method for queuing a texture update in relation to a graphics stream, the method comprising the steps of:

queuing first texture data in a bus master buffer, wherein data in the bus master buffer is fetched sequentially by a graphics processor for use in processing the graphics stream;

queuing a first portion of the graphics stream in the bus master buffer such that the first portion of the graphics stream is fetched by the graphics processor after the first texture data, wherein the first portion of the graphics stream utilizes the first texture data;

queuing second texture data in the bus master buffer such that the second texture data is fetched by the graphics processor after the first portion of the graphics stream, wherein the second texture data modifies the first texture data; and queuing a second portion of the graphics stream in the bus master buffer such that the second portion of the graphics stream is fetched by the graphics processor after the second texture data, wherein the second portion of the graphics stream utilizes the second texture data.

8. A video graphics processing system comprising:

a memory, wherein the memory stores a queuing algorithm;

a first processor operably coupled to the memory, wherein the first processor executes the queuing algorithm such that the first processor operates in a specific and predetermined manner to perform the functions of:
- queuing first texture data in the memory;
- queuing a first set of command data in the memory, wherein the first set of command data is used with the first texture data to draw a first set of elements;
- queuing second texture data in the memory, wherein the second texture data modifies the first texture data;
- queuing a second set of command data in the memory, wherein the second set of command data is used with the second texture data to draw a second set of elements; and a second processor operably coupled to the memory and the first processor, wherein the second processor fetches the first texture data, the first set of command data, the second texture data, and the second set of command data sequentially from the memory, wherein the second processor utilizes the first set of command data and the first texture data to draw the first set of elements, and wherein the second processor utilizes the second set of command data and the second texture data to draw the second set of elements.

9. The video graphics processing system of claim 8, further comprising a bus operably coupled to the first processor, the memory, and the second processor, wherein the second processor takes control of the bus during fetching operations.

10. The video graphics processing system of claim 8, wherein the memory includes a bus master buffer, wherein the bus master buffer includes a plurality of bus master pages, and wherein texture data and command data are stored in the bus master pages.

11. The video graphics processing system of claim 10 further includes a descriptor buffer that includes a plurality of descriptors, wherein each descriptor of the descriptor buffer corresponds to a bus master page, and wherein each descriptor of the plurality of descriptors stores a size value, an origination location, and a destination location for a corresponding bus master page.

12. The video graphics processing system of claim 11, wherein each descriptor further includes a flag, wherein the flag indicates whether a stored bus master operation is continued in a subsequent descriptor.

13. The video graphics processing system of claim 8, wherein the second processor includes a buffer, and wherein the second processor stores a portion of fetched queued data in the buffer while performing operations using a preceding portion of the fetched queued data.

14. The video graphics processing system of claim 13, wherein the second processor includes a set of registers, and wherein fetched command data is stored in the registers.

15. The video graphics processing system of claim 14, further comprising a frame buffer, wherein texture data and elements produced by the second processor are stored in the frame buffer.

16. The video graphics processing system of claim 15, wherein each of the first and second sets of command data includes a corresponding starting point, a corresponding number of registers, and a set of register values for the corresponding number of registers.

* * * * *